United States Patent
Victorov (10) Patent No.: US 8,200,983 B1
(45) Date of Patent: Jun. 12, 2012

(54) SYSTEM AND METHOD FOR TAMPER-PROOFING EXECUTABLE BINARY ASSEMBLIES

(75) Inventor: Victor Y. Victorov, St. Petersburg (RU)

(73) Assignee: 9Rays.Net, Inc., Alexandria, VA (US)

( * ) Notice: Subject to any disclaimer, the term of this patent is extended or adjusted under 35 U.S.C. 154(b) by 1145 days.

(21) Appl. No.: 11/766,764

(22) Filed: Jun. 21, 2007

Related U.S. Application Data (60) Provisional application No. 60/825,117, filed on Sep. 9, 2006.

(51) Int. Cl.
*G06F 21/00* (2006.01)

(52) U.S. Cl. ............................ 713/187; 726/30; 713/194

(58) Field of Classification Search .................... None
See application file for complete search history.

(56) References Cited

U.S. PATENT DOCUMENTS

| | | | | |
|---|---|---|---|---|
| 6,560,774 | B1* | 5/2003 | Gordon et al. | 717/146 |
| 6,594,761 | B1* | 7/2003 | Chow et al. | 713/190 |
| 6,728,852 | B1* | 4/2004 | Stoutamire | 711/170 |
| 6,779,114 | B1* | 8/2004 | Chow et al. | 713/189 |
| 6,851,108 | B1* | 2/2005 | Syme et al. | 717/146 |
| 7,117,488 | B1* | 10/2006 | Franz et al. | 717/144 |
| 7,155,703 | B2* | 12/2006 | Meijer et al. | 717/116 |
| 7,644,440 | B2* | 1/2010 | Sinha et al. | 726/23 |
| 2003/0191940 | A1* | 10/2003 | Sinha et al. | 713/176 |
| 2004/0003380 | A1* | 1/2004 | Fedorov | 717/148 |
| 2004/0236955 | A1* | 11/2004 | Chow et al. | 713/190 |
| 2005/0015753 | A1* | 1/2005 | Meijer et al. | 717/136 |
| 2005/0252977 | A1* | 11/2005 | Grezes et al. | 235/492 |
| 2006/0080531 | A1* | 4/2006 | Sinha et al. | 713/168 |
| 2007/0169019 | A1* | 7/2007 | Leino et al. | 717/136 |

OTHER PUBLICATIONS

"Obfuscation—String Encryption," Jason Haley, Jun. 16, 2006, http://jasonhaley.com/blog/post/2006/06/15/Obfuscation-String-Encryption-.aspx.*
"Obfuscation—Renaming and Simple Code Removal," Jason Haley, Jun. 4, 2006, http://jasonhaley.com/blog/post/2006/06/04/Obfuscation-Renaming-and-Simple-Code-Removal.aspx.*
"Obfuscate It—Thwart Reverse Engineering of Your Visual Basic .NET or C# Code," Torok et al., Gabriel Torok; Bill Leach, Nov. 2003.*
"Remotesoft .NET Obfuscator User Manual," Remotesoft, Nov. 6, 2002, http://web.archive.org/web/20030418073048/www.remotesoft.com/salamander/obfuscator/manual/index.html.*
"Review: RemoteSoft Explorer, Decompiler, Obfuscator and Protector," Bromberg, Dec. 13, 2002, http://www.eggheadcafe.com/articles/20021213.asp.*

* cited by examiner

*Primary Examiner* — Oscar Louie
(74) *Attorney, Agent, or Firm* — Bardmesser Law Group (57) ABSTRACT

A method, system and computer program product for tamper-proofing an executable assembly, including identifying assembly-time constants in source code; encrypting the assembly-time constants during the assembly process using public key cryptography; and signing the executable assembly using a digital signature. The executable assembly, at run-time, decrypts the assembly-time constants using the digital signature. A hashing function, a compression function or a one-way cryptographic block function is used to encrypt the assembly-time constants. Different keys or the same keys can be used to launch the assembly and to encrypt the assembly-time variables. The assembly-time constants are placed into a heap prior to the encrypting step. The assembly-time constants include strings and databases.

22 Claims, 4 Drawing Sheets

SYSTEM AND METHOD FOR TAMPER-PROOFING EXECUTABLE BINARY ASSEMBLIES

CROSS REFERENCE TO RELATED APPLICATIONS

This application is a non-provisional of U.S. Provisional Patent Application No. 60/825,117, filed 9 Sep. 2006, entitled SYSTEM AND METHOD FOR TAMPER-PROOFING EXECUTABLE BINARY ASSEMBLIES, which is incorporated herein by reference in its entirety.

BACKGROUND OF THE INVENTION

1. Field of the Invention

The present invention is related to protection of executable software code from copying by hackers and cloners, and more particularly, to the use of encryption and cryptography for generating of tamper-proof software executable code builds.

2. Description of the Related Art

The problem of prevention of copying of software is one that has great relevance today, particularly where many tools are available to hackers and cloners to copy, reverse assemble, reverse compile code. The problem has been particularly exacerbated in recent years due to the fact that much of the software is now available in downloadable form. Early attempts at creation of tamper-resistant code builds involved relatively simple schemes, such as checksum functions, CRC (cyclic redundancy check) or digital signature functions. As part of the tamper-proof mechanism, the executable code generated a value, such as a checksum, a CRC value or a digital signature hash (digest of a signature) value, from the executable code (in other words, from itself), and compared that value with a value that was stored somewhere within the code. A difference in the two values meant that the copy of the executable file that was being run was a fraudulently obtained one, and the tamper resistance mechanism would abort the execution of the executable file.

A similar digital signature technology is used in email encryption, when the email itself contains a public portion of the key, so that the recipient of the email can be certain that the sender has not faked his identity. The same mechanism is used for assembly verification (assembly signing), to created strong-named assemblies, where the runtime process that installs the assembly and launches its execution can check the signature and confirm that the contents of the assembly has not been tampered with.

In recent years, various cryptographic functions have been used to enhance the protection and the tamper resistance level available to vendors of software. Rather than using relatively simple (in cryptographic terms) functions such as checksums and CRCs, other, more advanced mechanisms have been employed. For example, various hash functions have become more popular, as a means for generating a value (called "hash value") based on the file (in this case, the executable file). Examples of such hash functions include MD4, MD5, etc. —the nature of the hash functions is such that even a small change in the input, or even a 1 bit change in the input file used to generate the hash function value, will result in a completely different hash function value.

Furthermore, hash functions are an example of "one way functions"—i.e., functions such that knowing the output value, it is virtually impossible to work backwards to generate the original data used to generate the hash function value. Furthermore, with most modern hash functions, which generate 40-bit output values, or 64-bit output values, the probability of two different input files generating the same hash function values (where there are $2^{40}$ or $2^{64}$ possible hash function values, or $2^{160}$ for some of the stronger hash functions, such as SHA1) is vanishingly small.

.NET assemblies have an optional provision for including tamper resistance (also known as "integrity verification" or "strong-name") as part of the build. To generate a .NET assembly, source code (such as C++, JAVA, etc.) is converted to what is known as "intermediate language", or IL, format. The IL code is then assembled into a binary executable file. The mechanism for tamper resistance in the .NET assemblies uses cryptography to embed into the executable public part of key for signing and subsequent verification of assembly integrity by .Net runtime. If the assembly has changed, then the hash would not match the stored value, and the .Net assembly would trigger a strong name verification exception.

Figure 1:
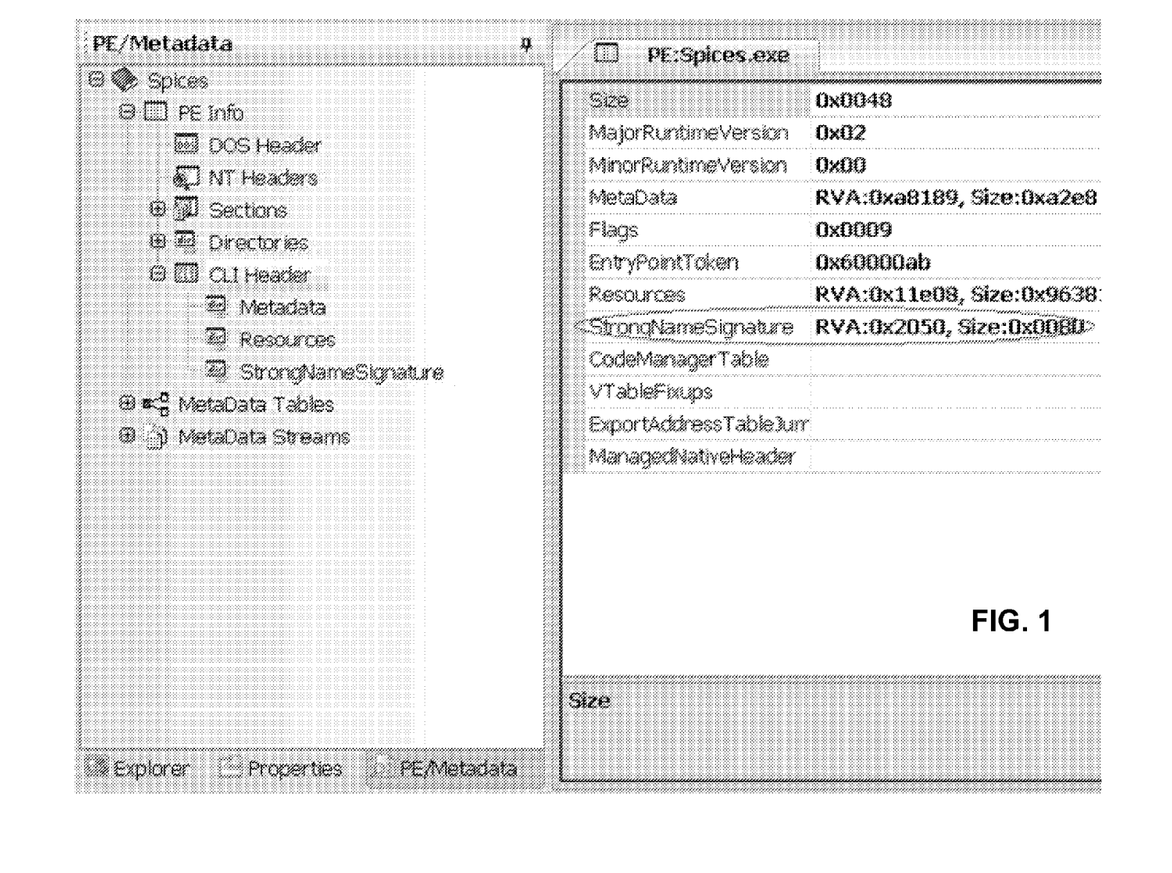
FIG. 1 illustrates an example of how metadata is used to sign an assembly.

.NET metadata stores information relating to the public key and the hash of the public key, and defines whether this build is signed or not signed, using a cryptographic key (using a public key cryptography scheme). The public portion of the key is also located in the executable assembly, at an offset specified by the virtual address in the metadata (see FIG. 1), and its size is defined by the CLIHeader (or COM+ header). The .Net runtime identifies the presence of the signature, and verifies it. If the signature is correct (i.e., the assembly has not been altered), the .Net runtime then launches the assembly.

Thus, if the executable file is signed, the .Net runtime will check that whether or not this is a signed assembly, and then, using the public portion of the key which is also embedded in the binary executable file, will check that the control value generated from the key is the same as the control value generated from the executable binary. If the control values (hashes) do not match, then the attempt to run the executable code will fail.

This scheme, however, has a flaw—the location of the signature and public key that determines whether this build is a signed assembly or an unsigned assembly, is known. A hacker can manually edit the binary (or use any of the variety of tools that permit patching of executable binaries), to zero out that field in the binary file (resulting in a clear or empty signature), so that the executable code, when installing and launching, will consider itself to be an unsigned build. As such, the presence of the public portion of the key in the executable file becomes irrelevant, since the executable binary will never check it. Also, the hacker can generate his own key, and alter the public key portion of the key stored in the binary—in other words, the hacker can generate his own keys, re-sign the assembly, and therefore, sell his own licenses to the assembly, or distribute them for free, adding his own license generator.

After generating an unsigned executable binary, a hacker can then publish the code as freeware, or can add a wrapper around it, which will require a digital signature of its own, or can add his own wrapper around the binary, which will then require a signature from the user—in other words, by doing so, the hacker can get into the business of selling or distributing the same product code, but requiring a license to himself, not to the vendor of the software.

Accordingly, there is a need in the art for a more reliable mechanism of tamper-proofing binary assemblies.

SUMMARY OF THE INVENTION

Accordingly, the present invention is related to a system, method and computer program product for tamper-proofing executable binary assemblies that substantially obviates one or more of the disadvantages of the related art.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

One-way functions, such as hash functions, have long been used as a mechanism for converting data into control values. Examples of commonly used hash functions are MD4, MD5, SHA-0, SHA-1, SHA-224, SHA-256, SHA-512, as well as many others. Most of the commonly used hash functions operate by converting an input string of an arbitrary length into a control value, known as the "hash value," which is of a specified length. Using the SHA-1 function as an example, the hash value is 160 bits long, which means that the number of possible hash values is $2^{160}$. This is, obviously, a very large number. Furthermore, most one-way functions used in cryptographic applications are such that a change of even one bit in the input data stream results in a completely different hash value at the output. Thus, while the hashing does not guarantee that two different inputs (for example, two different passwords, or two different files) will result in a unique hash value, with $2^{160}$ possible hash values, in practice, this is usually the case. Any of these functions can be used in the present invention for purposes of encryption of a password or key needed to decrypt the assembly time constants.

The approach described herein utilizes public key cryptography to encrypt certain information within the executable binary itself. In particular, there are two types of variables that most such executable code has—variables whose values are determined at run-time, and variables whose values are determined at assembly time. Run-time values are those that depend on some input, for example, from the user—when a program asks a user to enter his age, it needs to wait for that input before it can do anything else. This is an example of a run-time variable.

Certain other variables are treated essentially as constants. For example, some numerical values (e.g., the value of pi, 3.14, or the value of e, 2.718), or the values of certain string variables used in the graphical user interface, are constants. For instance, if a user is asked whether or not he wants to save the results of his work, a function (or "method," in .NET terminology) such as WriteLine (string) needs to be invoked, to write a line to the screen. In this case, the function would look like WriteLine ("Project '{0}' has been changed. Save changes?"). Most software programs, particularly those that interface to users through various on-screen queries, wizards, forms, etc., contain numerous such string-type variables, which are essentially constants. These might be kept as separate variables (for example, by initializing a string variable "SAVEQUESTION" to "Project '{0}' has been changed. Save changes?"), or by simply writing the value of the string within the source code itself (i.e., WriteLine ("Project '{0}' has been changed. Save changes?")), but they are normally initialized at assembly time, since their values are known in advance.

Figure 2:
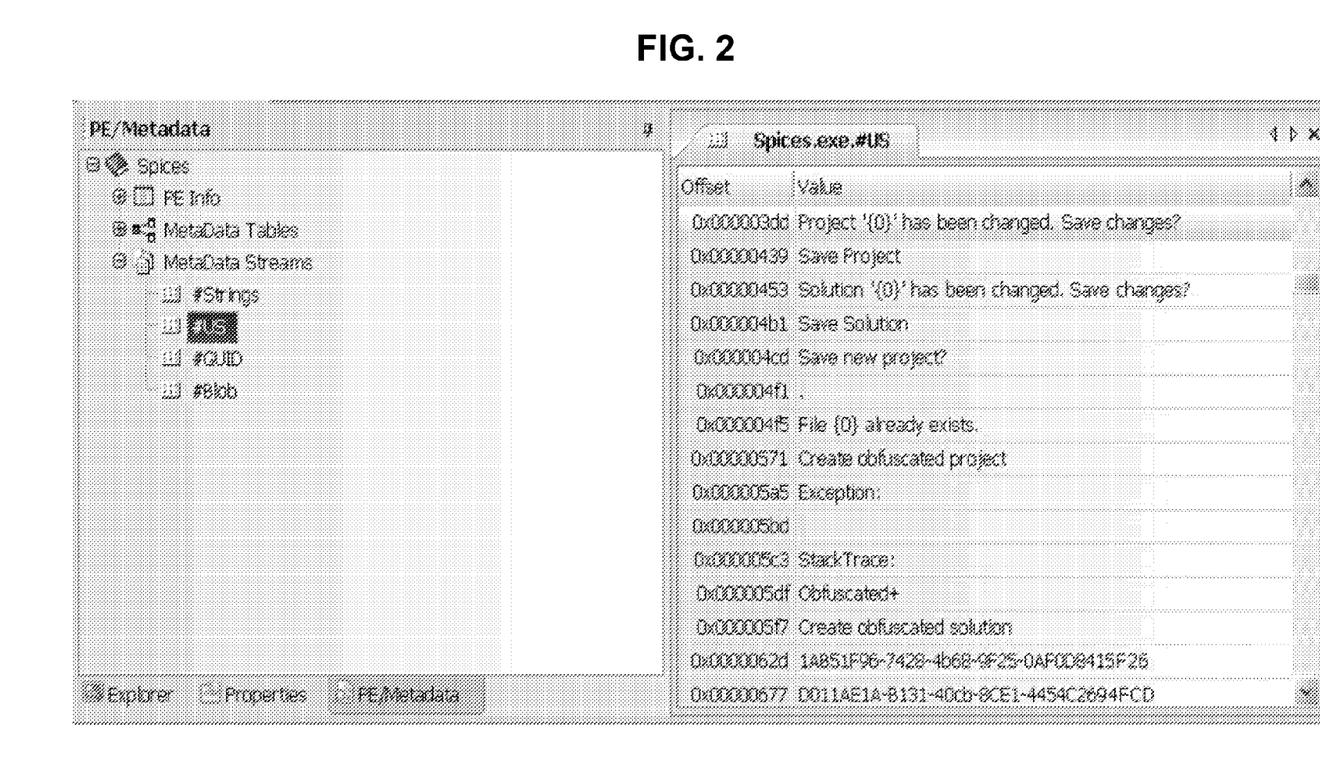
FIG. 2 illustrates an example of data that can be encrypted using the approach described herein.

The modern approach is to place all such assembly time variables into a "heap" which is essentially a container for holding such numeric and string type data constants. Other types of variables can also be placed in the heap, such as databases, etc. In essence, multiple lines of binary code are generated, containing the constants and the strings in a set of lines. For example, in FIG. 2, the metadata entry "Project '{0}' has been changed. Save changes?" is an example of User Strings Stream data that is determined at assembly time, and will be encrypted using the approach described herein. Similarly, the entry "Save Project" in FIG. 2 would be encrypted.

In the conventional approach, the heap is then assembled into an area within the executable binary, where these assembly time constants can be found—by examining the binary, a hacker can gain a substantial amount of insight into the code, as well as be able to distribute the codes himself, by defeating the integrity checking mechanism of .NET assemblies, as discussed above.

The solution to this is therefore to use cryptographic functions, to encrypt the assembly time variables/constants. In the example above, the string "Project '{0}' has been changed. Save changes?" would be encrypted, using public key cryptography. Thus, the form in which that string is stored in the executable binary is essentially meaningless. Even if a hacker were to zero out the byte that determines whether this is a signed or unsigned assembly, the display that the user would see on the screen would be essentially garbage, because of incorrect/failed decryption. Instead of meaningful strings representing characters and words, essentially random bits would be displayed if the hacker were to examine the binary file—including unprintable characters. In some cases, the attempt to print such unprintable characters at runtime using the WriteLine function will either fail, or may result in a system crash—this therefore means that demand for cloned/pirated software from this hacker should rapidly evaporate.

In many practical examples, it is not just individual strings that can be encrypted this way, but multiple strings, or "heaps"—in essence, a very long string (while the functions that work with such strings know where to find "their" string in the heap). Also, in addition to strings, other forms of binary data embedded in the binary executable can be encrypted—e.g., images, embedded graphics, bitmaps, jpegs, video, audio, mpegs, wav files, avi files, animation, logos, flash, and any other resources that are visible or audible to the user in the form of GUI. For example, many of the images that the user would see on the screen can be encrypted this way, rendering the GUI of the hacker's assembly useless.

Furthermore, it will be appreciated that the technology described herein is not particularly limited to .NET assemblies, but can be applicable to any tamper proofing scheme, where public key cryptography is used to verify the build integrity or the rights of the user to run the code.

As yet a further embodiment, as a separate option, or as an option combined with the embodiment described above, the heap can be compressed, using archiving algorithms, such as PKZIP, RAR, as well as many others. It should also be noted that although some algorithms are commonly used, such as ZIP, GZIP and RAR, there are many such archiving/compression algorithms, and many variations on these algorithms, which are regarded as somewhat exotic, and are rarely used. The decompression algorithm itself (but not the compression algorithm) can be embedded in the assembly, making it difficult for the hacker to know what the compression algorithm was, since it is rarely obvious from the decompression code exactly which compression algorithm used. Such compression algorithms can also be customized for minor variations. The use of such compression/decompression algorithms therefore will make it necessary for the cloner to acquire expertise in compression—in addition to the subject matter of the software itself. This means that without being able to compress the heap into its compressed form for assembly, the hacker could not generate a workable build.

It should also be noted that decompression is a relatively fast process (unlike some cryptographic algorithms, e.g., AES, DES, Blowfish, Twofish, etc., which are relatively processor-intensive), thus, compressing the heap before encrypting it is a useful optimization.

Additionally, the compressed heap can be password protected, with the password also embedded in the assembly itself, or a license protected with a password embedded in the license. The heap can also be automatically decompressed, using the same password, without having to ask the user for the password again or without having to extract password from license. The password can be the same password as used for protecting the entire assembly, or can be a different password. With strong enough encryption, and with using sufficiently robust hashing functions, such as SHA1, SHA256, and so on, the heap itself can be protected from cryptographic attack in a relatively straightforward manner.

It should also be noted that even though the password itself can be stored as part of the build, it is stored in its hashed form, rather than in its original form. Therefore, even if the hacker removes the requirement for checking whether or not the assembly is protected against tampering, the heap would still be "off limits" to the hacker.

It should also be recalled that most heaps, for typical assemblies, are relatively manageable in size, a few tens of kilobytes, perhaps 100-200 kilobytes. It is generally not common for most commercial software sold on the consumer market to have large text-based heaps. The recent trend has been in the direction of larger heaps, particularly due to the use of graphical elements, such as images, animation, flash, video, and so on. These elements can be encrypted/tamper-protected as described herein. However, it is worth noting that even if only the text is made tamper proof, but not other elements, this would still render the bootleg copy of the software with the tamper proofing flag reset virtually unusable, since a large part of the graphical user interface between the software and the end user would look like garbage.

It should also be noted that the decompression discussed earlier needs to be done only once, during launch, which is a very fast process for heaps that are 100-200 kilobytes in size, even for the more complex algorithms that involve compression and encryption. Therefore, it is not expected that the addition of this mechanism would affect usability and the time needed to launch the software in any significant way.

It should also be noted that the approach described herein is particularly useful for those languages and software architectures that utilize an intermediate language. Some examples of this are .NET architecture, JAVA, VisualBasic, and so on.

Another "collection" of data that can be handled in a similar manner is something called "ManagedResource" in the .NET architecture. This refers to data, both structured and unstructured, that is frequently used only once, for example, during boot up or initialization, or first use of the program, and rarely ever used again. Yet another resource where this approach can be applied to is data, both structured and unstructured, for filling out forms that is present in many software applications. For example, the names of the fields in the forms, the questions that prompt the user, and so on. More generally, almost any assembly-time information that can be used as a resource—strings, fixed numeric values, images, video, audio streams, unstructured BLOBs or file streams embedded into assembly as resource.

Yet another entity that can be handled in a similar manner as discussed above is something called BLOB in .NET architecture, which stands for binary large object (sometimes called "stream" in modern terminology), which is a binary resource loaded in a particular way such that the code loading the stream knows how to interpret it (essentially, where the offsets in the stream are for each particular piece of data). The BLOB is where binary data (rather than text data) is kept. The BLOB can be embedded in the code itself, rather than as a separate .NET entity, such that a hacker will see that there are no such managed resources, and no text lines, and no binary data that he can look at, in order to reconstruct the algorithm of the code.

It is also worth recalling that many hackers and cloners are often more interested in understanding the algorithm of the software they are trying to clone, rather than just mechanically copying the code by rote—by understanding the algorithm, they can offer similar products, at a much lower price, although sometimes with somewhat less functionality. Thus, by compressing and/or encrypting the text, video, and other binary data in this manner, the job of the hacker or cloner will be made considerably more difficult.

As yet another option, the text portion of the heap or ManagedResource can be compressed in a parsed/text-based/binary-based manner. For example, many words and phrases, or some binary "phrases" that the user sees as part of the graphical user interface of a program are often repetitive. For example, many questions that are often asked in different forms are very similar, often differing by only one or two words out of a sentence, or are frequently identical. Also, many words are often repetitive, from sentence to sentence, even if the sentences themselves are different.

Also, many different words that are used as part of the graphical user interface can have the same roots, word portions, suffixes or prefixes. For example, the words "box," "in," "boxer", "inbox" (a commonly used word in the IT industry), can be compressed into a string "inboxer," and the necessary word can be "constructed" for the GUI by specifying an offset into the string, and the number of letters/symbols used (or a combination of several such offsets and number of letters used). A similar approach can be taken with binary data—binary "phrases" can be stored in the bitstream, and repetitive patterns or portions of patterns can be "hidden" within larger patterns. For example, the binary phrase {0x01, 0 x05, 0x10, 0xff, 0xfa, 0xde}, can "hide" the phrase {0x05, 0x10, 0xff, 0xfa} within itself.

By going through the heap and the binary stream, and packing such repetitive words, repetitive sentences, commonly used suffixes, roots, and so on, the size of a heap can be reduced. But just as importantly, even if the hacker somehow were able to decrypt or decompress the heap, what he would see would be a long string of letters that is virtually unreadable. This provides yet another level of tamper proofing. Although in theory, a hacker, if he spent enough time, could reconstruct the words and the sentences, this would be a time consuming process, and even after that, the hacker would still need to know the algorithm for compression, the algorithm for encryption, and so on—in other words, the cost of the cloned product, after having to expend so much effort on cloning it, might be higher than the cost of the legitimate product. As a practical matter, most hackers and cloners have to work with relatively tight deadlines, and software code that is encrypted/compressed/packed in the manner described above presents a relatively "tough nut to crack" for a typical cloner. Given finite resources and time, a typical cloner would be more likely to seek easier targets of opportunity than software code protected against tampering in this manner.

Thus, to achieve the maximum possible protection against tampering, all of the following can be done:

(a) scan the code for assembly-time constants, such as text, binary data, audio, video, etc.

(b) form a heap from the constants;

(c) optimize/pack the heap by looking for repetitive patterns;

(d) compress the heap, if possible, both to reduce the size of the heap, and to provide an optional extra layer of tamper-proofing;

(e) encrypt the heap;

(f) place the encrypted heap into the assembly.

As yet another item that can be protected/encrypted against tampering is reference to a resource in an assembly. The resource is referenced using a class as follows: ResourceManager(typeof(SomeClass))). In this case, the resource manager forms the resource name as follows:

(a) Take the name of the class to which the resource belongs (SomeCompany)

(b) Take the name of the class ("SomeClass")

(c) Join the two using a separator (".")—resulting in the full class name SomeCompany.SomeClass (d) To the full class name, add the extension ".resources", to produce the final resource name: SomeCompany.SomeClass.resources.

Alternatively, a class can be referenced directly as follows: ResourceManager("someResource.resources"). In this case, the resource name is "someResource.resources".

Figure 4:
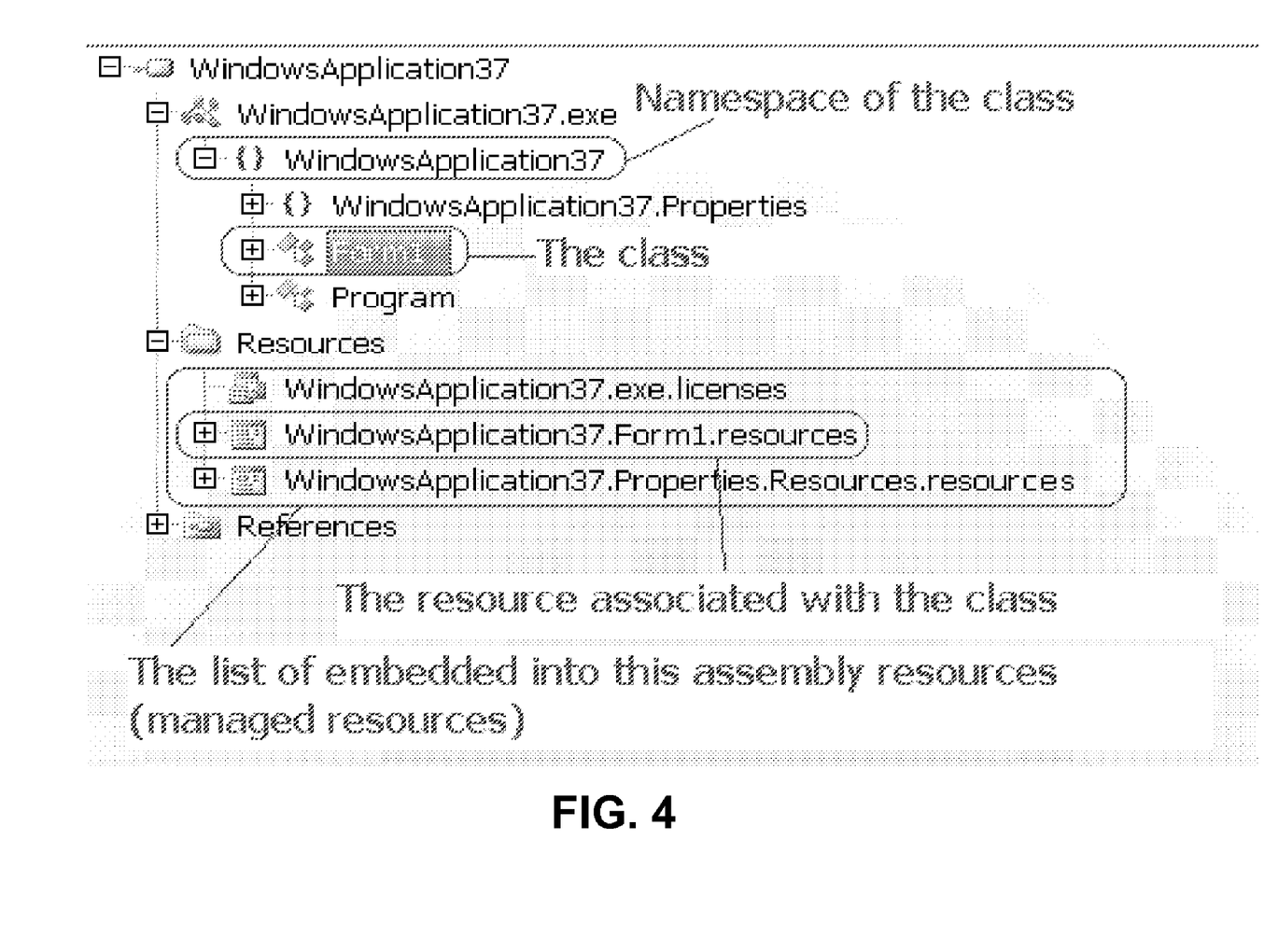
FIG. 4 illustrates an assembly tree with the resources identified.

The assembly tree with the resources is illustrated in FIG. 4. To protect against tampering, the tamper-proofing algorithm:

(1) Encrypts the names of the resources embedded in the assembly, by using a public key also embedded in the assembly. For example, the resource with the name "SomeCompany.SomeClass.resources" will now look like "Qdljl:sl+sl=s;kss;k/+e.resources".

(2) All instances of resource managing classes (often named ResourceManager, for example, or similar names, although, obviously the choice of the class name is up to the developer) in the assembly are replaced by a special class-wrapper, which inherits from resource managing classes (e.g., ResourceManager) (i.e., uses he same mechanism for naming resources for accessing those resources). The primary difference is that:

(a) Since the resource names are encrypted, then, to refer to the resource associated with that name (e.g., SomeCompany.SomeClass.resources), it is necessary to invoke that resource by forming the name of the resource—i.e., it is necessary to use the same cryptographic function used to encrypt SomeCompany.SomeClass.resources into Qdljl:sl+sl=s;kss;k/+e.resources in order to generate the correct name.

(b) The class-wrapper does a similar process, but prior to accessing the resources, it forms a correct name for those resources whose name has been encrypted.

Thus, if the assembly is not a legitimate one, the resources will not load correctly, since the name of the resource will not be formed correctly, and the resource will not be found, most likely leading to non-functioning code.

Since the link between the classes and their associated resources is broken, it is necessary to first establish which resource is associated with which encrypted name, i.e., the resource names need to be first decrypted, and then re-encrypt them in the cloned copy with a new key. This complicates the life of a cloner considerably (separate and apart from using the other mechanisms described herein).

Since decompilers/disassemblers typically use the same mechanisms for referring to classes as described earlier, and the resource names are already encrypted, this creates two difficulties for the hacker:

(1) the decompiler/disassembler will be unable to fully decompile the class; and (2) the encryption algorithm will convert the resource name into a string of symbols that often contain unprintable characters, or characters that the file system will not permit as characters for use in file names—resulting in errors when attempting to reference external resources or files. Therefore, working with such code will be difficult for the cloner—the unprintable characters will cause problems when printing or displaying the code on the monitor, and the file system will constantly return errors.

Another item that can be encrypted is the name of the assembly itself. This will prevent the cloner from forging identity of the assembly and, using an algorithm for license generation, change the name of the assembly (e.g., from SomeCompany.UsefulProgram to HackersCompany.CoolProgram). In the process of encryption of the heap, the key can be a combination of a key stored in the assembly and the full name of the assembly (which is also stored in the assembly). For example, the full name of the assembly could be:

NineRays.ILOMDTest, Version=1.0.2714.7697, Culture=neutral, PublicKeyToken=59d4bed864488801. This include the version, language, data format, hash of the public key (PublicKeytoken). To prevent the cloner from changing the full name to CoolHacker.Hello, Version=1.0.2714.7697, Culture=neutral, PublicKeyToken=59d4bed864488801 the name can be encrypted—thus, even without signing the assembly with his own key, the cloner will be unable to get the assembly to work, since the identity of the assembly has been changed.

This situation is not possible is .net assemblies, since changing the name of the assembly inherently changes the "internals" of the assembly, which would violate the integrity of the assembly. Such an assembly cannot be launched since it would not pass signature verification. But if the assembly is not signed—i.e., when the public key is not embedded in the assembly—encrypting the name in this manner can be useful. Instead of the public key, the full name of the assembly is used. For unsigned assemblies, it will look like:

NineRays.ILOMDTest, Version=1.0.2714.7697, Culture=neutral. For the general case, it is useful for runtime verifications, where there is no signature verification.

As yet a further option, actual Intermediate Language code, or portions of Intermediate Language code, can also by encrypted in the same manner as discussed above.

Figure 3:
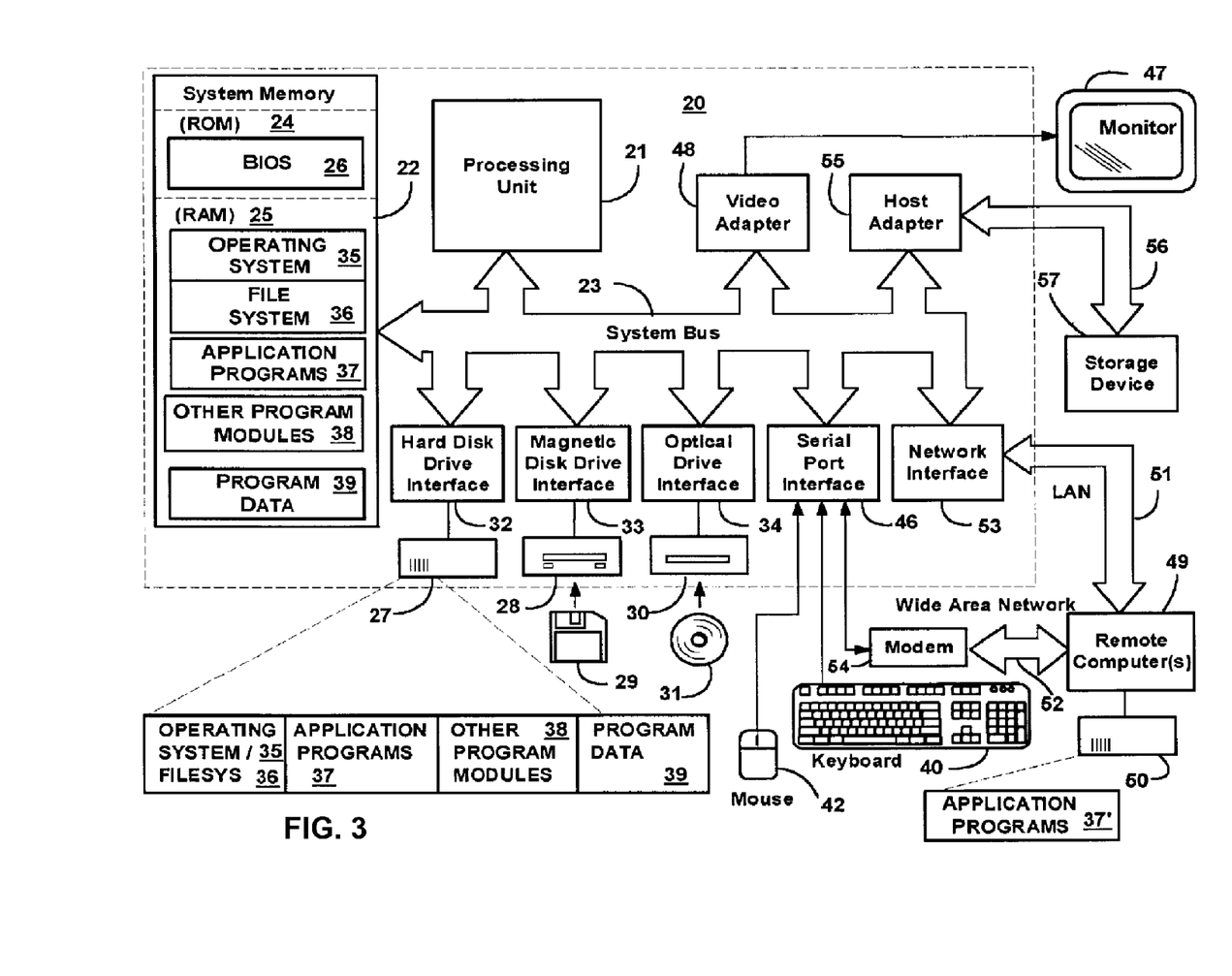
FIG. 3 illustrates an example of a computer system on which the invention may be implemented.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical storage devices. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, such as the Internet, local area networks, regional networks, wide area networks, and so forth. These networks can link various resources, such as user computers, servers, Internet service providers, telephones connected to the network, and so on.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer-implemented method of tamper-proofing an executable .Net assembly, the method comprising:
    on a computer having a processor, identifying assembly-time constants in intermediate language code;
    forming a heap of assembly-time constants, the heap being assembled as part of the executable .Net assembly;
    compressing the heap;
    encrypting the heap during an assembly, with a key for the encryption being derived from embedded information that uniquely identifies the executable .Net assembly; and
    signing the executable .Net assembly using a digital signature,
    wherein the executable .Net assembly, at run-time, decrypts the assembly-time constants using the key derived from the embedded information that uniquely identifies the executable .Net assembly.

2. The method of claim 1, wherein a cryptographic function is used to encrypt the assembly-time constants in the heap, and wherein the same password is used for the encryption of the assembly time constants as for protecting the entire executable .Net assembly.

3. The method of claim 1, wherein a compression algorithm is used to compress the assembly-time constants that were compressed into the heap.

4. The method of claim 1, further comprising packing text strings of the assembly-time constants into a heap such that duplicate strings are eliminated.

5. The method of claim 1, wherein a cryptographic block function is used to encrypt the assembly-time constants, and wherein a different password is used for the encryption of the assembly time constants as for protecting the entire executable .Net assembly.

6. The method of claim 1, wherein different keys are used to launch the executable .Net assembly and to encrypt the assembly-time variables.

7. The method of claim 1, wherein the assembly-time constants are placed into the heap prior to the compressing and encrypting steps.

8. The method of claim 1, wherein the assembly-time constants include strings.

9. The method of claim 1, wherein the assembly-time constants include databases.

10. The method of claim 1, wherein the assembly-time constants include graphical images.

11. The method of claim 1, wherein the assembly-time constants include video images.

12. The method of claim 1, wherein the assembly-time constants include any of strings, images, video, audio, binary constants, numeric constants, arrays of data, ManagedResources, BLOBs and binary streams.

13. The method of claim 1, wherein the assembly-time constants include resource names.

14. The method of claim 1, wherein the assembly-time constants include a name of the executable .Net assembly.

15. A computer-implemented method of tamper-proofing an executable .Net assembly, the method comprising:
   on a computer having a processor, identifying assembly-time constants in intermediate language code;
   packing text strings and binary stream portions of the assembly-time constants into a heap such that duplicates are eliminated, the heap being assembled as part of the executable .Net assembly;
   encrypting the packed assembly-time constants during an assembly process, with a key for the encryption being derived from embedded information that uniquely identifies the executable .Net assembly; and
   signing the executable .Net assembly using a digital signature,
   wherein the executable .Net assembly, at run-time, decrypts the assembly-time constants using the key derived from the embedded information that uniquely identifies the executable .Net assembly.

16. The method of claim 15, further comprising forming the heap from the assembly-time constants, and compressing the heap prior to the encrypting step.

17. The system of claim 16, wherein a cryptographic function is used to encrypt the assembly-time constants in the heap, and wherein the same password is used for the encryption of the assembly-time constants as for protecting the entire executable .Net assembly.

18. The method of claim 15, wherein the assembly-time constants include strings.

19. The method of claim 15, wherein the assembly-time constants include graphical images.

20. A system configured to tamper-proof an executable .Net assembly, the system comprising a processor, a memory coupled to the processor, and computer code loaded into the memory for implementing:
   means for forming a heap from assembly-time constants in intermediate language code, the heap being assembled as part of the executable .Net assembly;
   means for compressing the heap;
   means for encrypting the heap during an assembly process, with a key for the encryption being derived from embedded information that uniquely identifies the executable .Net assembly; and
   means for signing the executable .Net assembly using a digital signature,
   wherein the executable .Net assembly, at run-time, decrypts the assembly-time constants using the key derived from the embedded information that uniquely identifies executable .Net assembly.

21. A system configured to tamper-proof an executable .Net assembly, the system comprising:
   means for packing text strings and binary stream portions of assembly-time constants into a heap such that duplicates are eliminated, the heap being assembled as part of the executable .Net assembly;
   means for encrypting the packed assembly-time constants during an assembly process, with a key for the encryption being derived from embedded information that uniquely identifies the executable .Net assembly; and
   means for signing the executable .Net assembly using a digital signature,
   wherein the executable .Net assembly, at run-time, decrypts the assembly-time constants using the key derived from the embedded information that uniquely identifies executable .Net assembly.

22. A method of tamper-proofing an executable .Net assembly, the method comprising:
   on a computer having a processor, identifying resource names in intermediate language code;
   replacing resource managing classes with a class-wrapper that inherits from a resource managing class;
   encrypting the resource names during an assembly process with a key derived from embedded information that uniquely identifies the executable .Net assembly, including a full assembly name; and
   signing the executable .Net assembly using a digital signature,
   wherein the executable .Net assembly, at run-time, decrypts the resource names using one of the key and the full assembly name.

* * * * *